(12) United States Patent
Li

(10) Patent No.: US 12,277,358 B2
(45) Date of Patent: Apr. 15, 2025

(54) IMAGE FORMING CONTROL METHOD FOR CONSUMABLE CHIP IN IMAGE FORMING APPARATUS

(71) Applicant: Zhuhai Pantum Electronics Co., Ltd., Zhuhai (CN)

(72) Inventor: Haixiong Li, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/456,466

(22) Filed: Aug. 25, 2023

(65) Prior Publication Data

US 2023/0401024 A1 Dec. 14, 2023

Related U.S. Application Data

(63) Continuation of application No. 17/544,320, filed on Dec. 7, 2021, now Pat. No. 11,782,665.

(30) Foreign Application Priority Data

Dec. 8, 2020 (CN) .......................... 202011425780.6
Nov. 10, 2021 (CN) .......................... 202111325506.6

(51) Int. Cl.
*G06F 3/12* (2006.01)

(52) U.S. Cl.
CPC .......... *G06F 3/1297* (2013.01); *G06F 3/1208* (2013.01); *G06F 3/1219* (2013.01); *G06F 3/1229* (2013.01)

(58) Field of Classification Search
CPC .............................. G06F 3/1219; G06F 3/1229

USPC ............ 358/1.15; 399/24, 25, 26, 44, 94, 97
See application file for complete search history.

(56) References Cited

U.S. PATENT DOCUMENTS 6,483,996 B2 * 11/2002 Phillips .................. B41J 29/393
399/49
2005/0116983 A1 6/2005 Wada
2010/0028031 A1 2/2010 Lee et al.
(Continued)

FOREIGN PATENT DOCUMENTS

| CN | 1139224 A | 1/1997 |
| CN | 101639636 A | 2/2010 |
| CN | 103197522 A | 7/2013 |

(Continued)

OTHER PUBLICATIONS

Machine Translated JP-2016-083917 (Fushimi, May 19, 2006) (Year: 2016).

*Primary Examiner* — Jamares Q Washington
(74) *Attorney, Agent, or Firm* — ANOVA LAW GROUP, PLLC

(57) ABSTRACT

Embodiments of the present disclosure provide an image forming control method, a consumable chip, an image forming apparatus, and a consumable. For the image forming control method, based on the environmental data, the encryption and decryption processing and transmission are performed on the preset compensation value of the image forming control parameter using the environmental data respectively detected by the consumable chip and the image forming apparatus. The preset compensation value is prevented from being intercepted and tampered during transmission, which makes data transmission more secure, thereby ensuring the printing and image forming quality.

27 Claims, 5 Drawing Sheets

(56) References Cited

U.S. PATENT DOCUMENTS

2014/0270814 A1    9/2014    Ignatchenko

FOREIGN PATENT DOCUMENTS

| | | | | |
|---|---|---|---|---|
| CN | 104184586 | A | 12/2014 | |
| CN | 105637426 | A | 6/2016 | |
| CN | 107073947 | A | 8/2017 | |
| CN | 109298615 | A | 2/2019 | |
| CN | 107901608 | B * | 5/2019 | ............ B41J 2/1755 |
| CN | 110001210 | B | 7/2019 | |
| CN | 111158229 | A | 5/2020 | |
| EP | 3263340 | A1 | 1/2018 | |
| JP | 200647579 | A | 2/2006 | |
| JP | 2008176345 | A | 7/2008 | |
| JP | 6516222 | B2 * | 5/2019 | |
| WO | 2014035408 | A1 | 3/2014 | |
| WO | WO-2019090514 | A1 * | 5/2019 | .............. B41J 2/175 |

\* cited by examiner

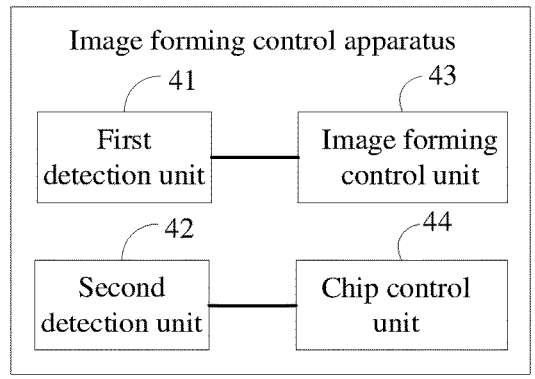

FIG. 5

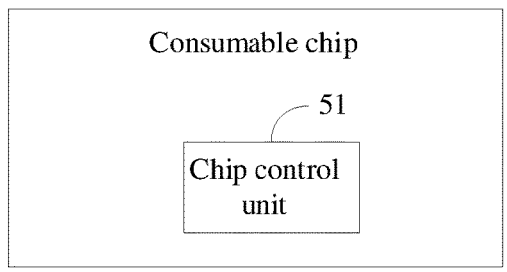

FIG. 6

Obtaining, by the image forming control unit, data to-be-written which is to be written to the consumable chip and the verification data configured to determine correctness of the data to-be-written; generating the second conversion parameter based on the data to-be-written, the verification data and the third preset conversion intermediate parameter; and sending the second conversion parameter to the consumable chip — 701

Sending, by the consumable chip, preset response information to the image forming control unit based on the second conversion parameter, where the preset response information is configured to determine whether the data to-be-written has been successfully written to the consumable chip — 702

FIG. 7

IMAGE FORMING CONTROL METHOD FOR CONSUMABLE CHIP IN IMAGE FORMING APPARATUS

CROSS-REFERENCE TO RELATED APPLICATION

This application is a continuation application of U.S. patent application Ser. No. 17/544,320 filed on Dec. 7, 2021, which in turn claims priority to Chinese patent application No. 202011425780.6, filed on Dec. 8, 2020, and No. 202111325506.6, filed on Nov. 10, 2021, in the China National Intellectual Property Administration, the entirety of all of which is incorporated herein by their reference.

TECHNICAL FIELD

The present disclosure generally relates to the field of image forming technology and, more particularly, relates to an image forming control method, a consumable chip, an image forming apparatus, and a consumable.

BACKGROUND

In the manufacturing process of consumables such as toner cartridges and the like, consumables such as toners and the like may be replaced or updated, and the output quality and safety of printers are greatly affected by the consumables.

In order to ensure desirable print quality, different image forming control parameters need to be used. Normally, the image forming control parameters are stored in the consumable chips of the consumables such as toner cartridges and the like. The printers communicate with the consumable chips to obtain the above-mentioned image forming control parameters.

However, the communication between the printers and the consumable chips in the existing technology is normally through cipher code exchange, which is easy to be intercepted for analysis and tampering. After the consumables are installed on the printers, when the printers use the image forming control parameters, it may cause print output quality to be reduced or printer components to be damaged.

SUMMARY

Embodiments of the present disclosure provide an image forming control method, a consumable chip, an image forming apparatus, and a consumable, which may solve the technical problem that the preset compensation value of the image forming control parameter stored in the consumable chip in the existing technology is easily intercepted and tampered resulting in that the print output quality is reduced or even the printer components are damaged.

The first aspect of embodiments of the present disclosure provides an image forming control method, applied to a consumable chip, wherein the consumable chip is installed on a consumable, and the consumable is detachably installed on an image forming apparatus. The method includes obtaining second environmental data of environment where the consumable chip is currently located; determining a preset compensation value of an image forming control parameter corresponding to the second environmental data and a second preset conversion intermediate parameter corresponding to the second environmental data; generating a first conversion parameter based on the preset compensation value and the second preset conversion intermediate parameter; and sending the first conversion parameter to the image forming apparatus, wherein the first conversion parameter is configured to determine a target image forming control parameter that satisfies a preset image forming condition.

The second aspect of embodiments of the present disclosure provides an image forming apparatus, installed with a consumable, where the consumable is installed with a consumable chip, and the consumable chip includes a chip control unit. The image forming apparatus includes: a first detection unit, configured to detect first environmental data of internal environment of the image forming apparatus; a second detection unit, configured to detect second environmental data of environment where the consumable chip is located; the chip control unit, configured to obtain the second environmental data of the environment where the consumable chip is located; determine a preset compensation value of an image forming control parameter corresponding to the second environmental data and a second preset conversion intermediate parameter corresponding to the second environmental data; generate a first conversion parameter based on the preset compensation value and the second preset conversion intermediate parameter; and send the first conversion parameter to an image forming control unit of the image forming apparatus; and the image forming control unit, configured to receive the first conversion parameter corresponding to the preset compensation value of the image forming control parameter sent by the consumable chip; determine a first preset conversion intermediate parameter corresponding to the first environmental data; based on the first preset conversion intermediate parameter, perform the conversion processing on the first conversion parameter using a preset second conversion algorithm to obtain the preset compensation value; and based on the preset compensation value and a preset image forming control parameter, determine a target image forming control parameter that satisfies a preset image forming condition according to a preset algorithm.

The third aspect of embodiments of the present disclosure provides a consumable chip, where the consumable chip is capable of being installed on a consumable, and the consumable is capable of being detachably installed on an image forming apparatus. The consumable chip includes:

a chip control unit, configured to obtain second environmental data of environment where the consumable chip is located; determine a preset compensation value of an image forming control parameter corresponding to the second environmental data and a second preset conversion intermediate parameter corresponding to the second environmental data; generate a first conversion parameter based on the preset compensation value and the second preset conversion intermediate parameter; and send the first conversion parameter to the image forming apparatus, where the first conversion parameter is configured to determine a target image forming control parameter that satisfies a preset image forming condition.

The fourth aspect of embodiments of the present disclosure provides a consumable, including a housing, a developer accommodating portion, and the consumable chip according to the third aspect.

The fifth aspect of embodiments of the present disclosure provides a consumable, including a photosensitive drum, a charging roller, and the consumable chip according to the fourth aspect.

Embodiments of the present disclosure provide the image forming control method, the consumable chip, the image forming apparatus, and the consumable. The method is applied to the image forming apparatus and the consumable chip; and the image forming apparatus is detachably installed with the consumable. In such method, based on the environmental data, the encryption and decryption processing and transmission may be performed on the preset compensation value of the image forming control parameter using the environmental data respectively detected by the consumable chip and the image forming apparatus, which may avoid the technical problem that the preset compensation value of the image forming control parameter stored in the consumable chip in the existing technology is easily intercepted and tampered resulting in that the print output quality is reduced or even the printer components are damaged. Therefore, the data transmission is more secure, thereby ensuring the printing and image forming quality.

BRIEF DESCRIPTION OF THE DRAWINGS

The drawings here are incorporated into the specification and constitute a part of the specification, which illustrate embodiments which are consistent with the present disclosure, and are configured, together with the specification, to describe the principle of the present disclosure.

FIG. 5 illustrates a structural schematic of an image forming apparatus provided by exemplary embodiments of the present disclosure;

FIG. 6 illustrates a structural schematic of a consumable chip provided by exemplary embodiments of the present disclosure;

FIG. 7 illustrates a flowchart of another image forming control method provided by exemplary embodiments of the present disclosure.

Figure 1:
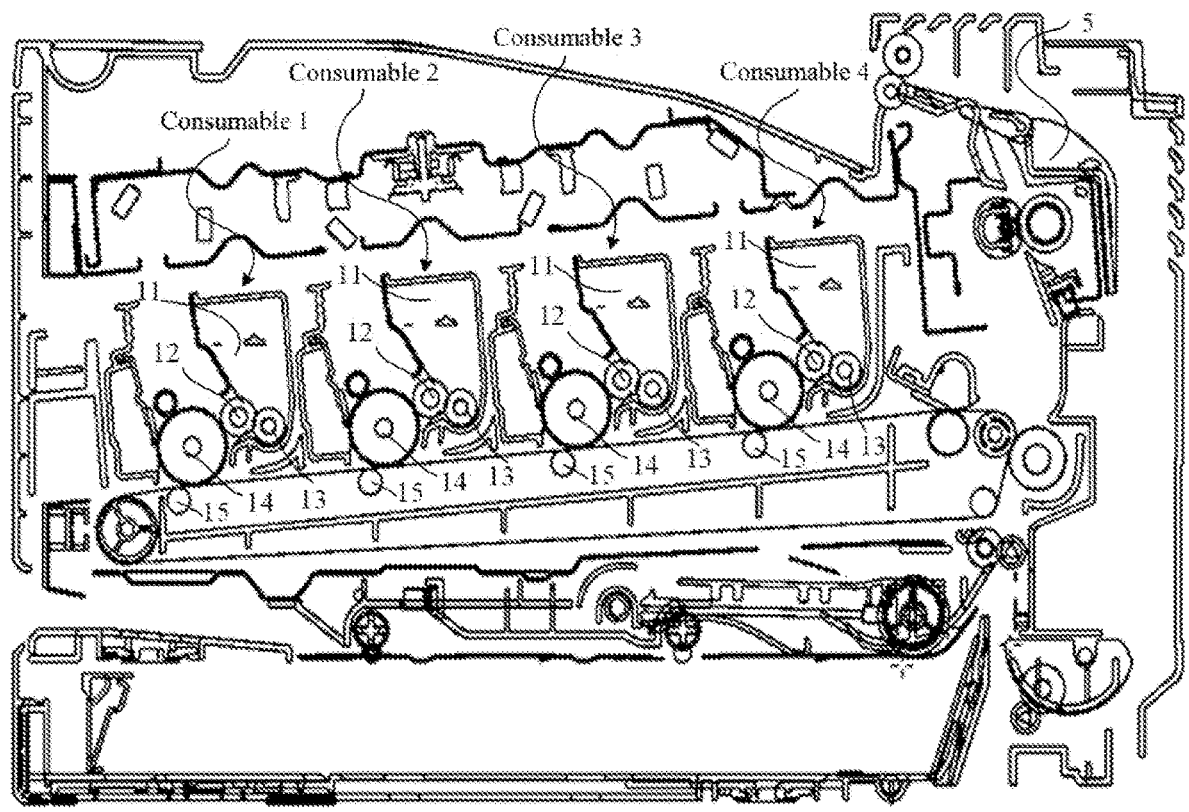
FIG. 1 illustrates a structural schematic of an image forming apparatus provided by one exemplary embodiment of the present disclosure.

Through the above-mentioned drawings, specific embodiments of the present disclosure have been shown, which are described in more detail hereinafter. These drawings and text descriptions are not intended to limit the concept scope of the present disclosure in any way, but to explain the concept of the present disclosure to those skilled in the art by referring to specific embodiments.

DETAILED DESCRIPTION

Exemplary embodiments are described in detail herein, and examples thereof are shown in the accompanying drawings. When the following description refers to the drawings, unless otherwise indicated, same numbers in different drawings indicate same or similar elements. The implementation manners described in the following exemplary embodiments do not represent all implementation manners consistent with the present disclosure. On the contrary, they are merely examples of systems and methods consistent with some aspects of the present disclosure as detailed in the appended claims.

In the manufacturing process of consumables such as toner cartridges and the like, consumables such as toners and the like may be replaced or updated, and the output quality and safety of printers are greatly affected by the consumables. In order to ensure desirable print quality, different image forming control parameters need to be used. Normally, these image forming control parameters are stored in the consumable chips of the consumables such as toner cartridges and the like. The printers communicate with the consumable chips to obtain the above-mentioned image forming control parameters. However, the communication between the printers and the consumable chips in the existing technology is normally through cipher code exchange, which is easy to be intercepted for analysis and tampering. After the consumables are installed on the printers, when the printers use these image forming control parameters, it may cause the print output quality to be reduced or printer components to be damaged.

In order to solve the above-mentioned problem, in embodiments of the present disclosure, the environmental data on the chip side and the environmental data on the printer side are detected, and the preset compensation value is encrypted and decrypted based on the above-mentioned environmental data, which may avoid the technical problem that the preset compensation value of the image forming control parameter stored in the consumable chip in the existing technology is easily intercepted and tampered resulting in that the print output quality is reduced or even the printer components are damaged. Therefore, the data transmission is more secure, thereby ensuring the printing and image forming quality and preventing the printer component damage.

In one embodiments of the present disclosure, the image forming apparatus may be configured to perform image forming tasks, such as generating, printing, receiving, and transmitting image data; and examples of image forming apparatuses may include inkjet printers, laser printers, LED (light-emitting diode) printers, copiers, scanners, multifunction all-in-one fax machines, and multifunction peripherals (MFP) that perform the above-mentioned functions in a single device. The image forming apparatus may include an image forming control unit and an image forming unit, where the image forming control unit may be configured to control the entire image forming apparatus, and the image forming unit may be configured to form images on the conveyed paper under the control of the image forming control unit based on the image forming data and the developer such as toners and the like stored in the consumables.

The main controller may be a system on chip (SoC) which is a miniature system including multiple system components, configured to control image forming processing operations of the image forming apparatus; and for example, the operations may include processing such as performing linear correction, noise reduction, dead pixel removal, detail enhancement, and the like on image data to improve the image output quality. The image forming control unit may further be configured to perform data transmission and reception, instruction transmission and reception, and engine control related processing operations for printing portraits. For example, the image forming control unit may be configured to perform the operations including transmitting and receiving data, and printing engine control instructions, statuses, and the like through an interface unit (may include, but may not be limited to, a USB port, a wired network port, a wireless network port, other interfaces, and/or the like).

FIG. 1 illustrates a structural schematic of an image forming apparatus provided by exemplary embodiments of the present disclosure. Referring to FIG. 1, as an example of the image forming apparatus, the image forming unit of the image forming apparatus may include a developer accommodating portion 11, a developing element 12, a developer conveying element 13, a photosensitive element 14, a transfer element 15, a fixing assembly 5, and the like. After papers to be printed move along a paper feeding direction and pass through the toner feeding operation of the developer conveying element 13 and the developing operation of the developing element 12 in sequence, the papers to be printed may reach the holding area between the photosensitive element 14 and the transfer element 15 for transfer printing, and then the papers to be printed may pass the fixing assembly 5 for fixing, thereby completing the image forming operation. The developer accommodating portion 11 may be configured to accommodate a developer. The developer may be a material including color toner, carbon toner, and the like; the photosensitive element 14 may include a photosensitive drum (e.g., organic photoconductor drum (OPC)), a charging roller, and the like, where the charging roller may be configured to charge the photosensitive drum; the developing element 12 may include a developing roller and the like, used for conveying the developer to the photosensitive component 14; the developer conveying element 13 may include elements such as a toner feeding roller and the like, or may be replaced with elements such as a toner pushing screw and the like, used for delivering the developer to the developing device 12.

Normally, the image forming apparatus may be detachably installed with at least one consumable. Take the image forming apparatus shown in FIG. 1 as an example, the image forming apparatus may be detachably installed with 4 consumables (a consumable 1, a consumable 2, a consumable 3, and a consumable 4 respectively shown in FIG. 1). Four consumables may be configured to provide the image forming apparatus with developers with four colors including black K, cyan C, magenta M, and yellow Y. Obviously, in other embodiments, the number of consumables installed in the image forming apparatus may be increased or decreased, for example, may be 1, 6, or the like, which may not be limited in the present disclosure.

The consumable chip may be specifically a circuit substrate installed on the consumable, and the circuit substrate may include a storage device and an electrical contact portion connected with the storage device. The electrical contact portion may be configured to connect with the electrical contact portion on the side of the image forming apparatus, and the electrical contact portion may be a conductive plane, a conductive probe, a conductive coil, or the like.

For the consumable installed with the chip, an implementation manner may be that the consumable may only include the developer accommodating portion 11.

An implementation manner may be that the consumable may be a split structure. For example, the consumable (1, 2, 3, or 4) may include a developing cartridge and a drum assembly which can be detached from each other. The developing cartridge may include a housing, the developer accommodating portion 11, the developing element 12, and the developer conveying element 13; and the drum assembly may include the photosensitive element 14 including the photosensitive drum and the charging roller. The developer accommodating portion 11 may be disposed in the housing for accommodating the developer. The developer conveying element 13 may be configured to convey the developer, and the developing element 12 may be configured to convey the developer to the photosensitive drum, where the developer conveying element may be a toner feeding roller or may also be another component such as a toner pushing screw or the like.

In an implementation manner, the consumable may be the above-mentioned developing cartridge.

In an implementation manner, the consumable material may be the above-mentioned drum assembly.

In an implementation manner, the consumable may be an integrated structure. For example, the consumable (1, 2, 3, or 4) may include the developer accommodating portion 11, the developing element 12, the developer conveying element 13, the photosensitive element 14, and the like.

It should be noted that the consumables mentioned in one embodiment may also be other components, parts, and units in the image forming apparatus that is easily damaged and needs to be replaced, such as paper boxes, which also be included in the technical solution corresponding to the consumables protected by the present disclosure.

Figure 2:
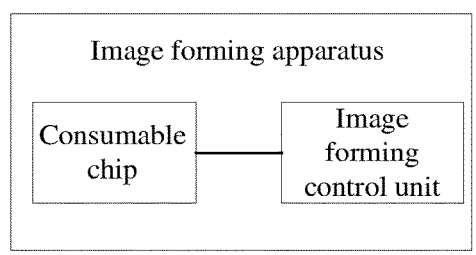
FIG. 2 illustrates an application scenario schematic provided by exemplary embodiments of the present disclosure.

FIG. 2 illustrates an application scenario schematic provided by exemplary embodiments of the present disclosure. As shown in FIG. 2, the consumable chip may perform calculation and the first conversion processing on detected data and transmit the data to the image forming control unit; and after receiving the above data, the image forming control unit may perform corresponding second conversion processing and calculation processing, such that the image forming apparatus may perform printing and image forming according to the processed data.

Embodiment One

Figure 3:
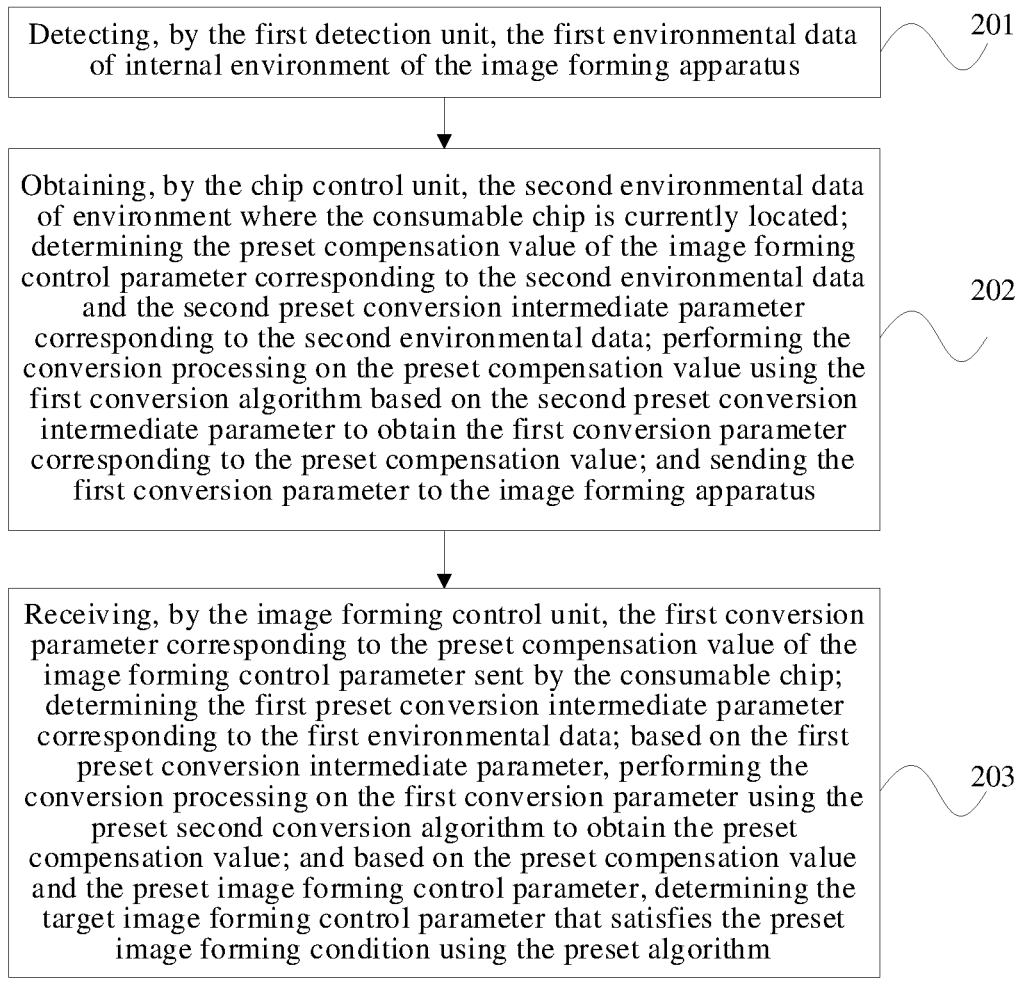
FIG. 3 illustrates a flowchart of an image forming control method provided by exemplary embodiments of the present disclosure.

FIG. 3 illustrates a flowchart of an image forming control method provided by exemplary embodiments of the present disclosure. As shown in FIG. 3, the method in one embodiment of the present disclosure may be applied to the image forming apparatus and the consumable chip. The image forming apparatus may be detachably installed with the consumable, and the consumable may be installed with the consumable chip. The image forming apparatus may include the image forming control unit and the first detection unit; and the chip may include a chip control unit. The method may include the following steps.

In step 201, the first detection unit may detect the first environmental data of the internal environment of the image forming apparatus.

In one embodiment, the first detection unit may include a sensor to detect the first environmental data of the internal environment of the image forming apparatus in real time, where the internal environment may refer to the environment of the internal space enclosed by the housing of the image forming apparatus. Specifically, the first detection unit may be a temperature sensor and/or a humidity sensor. Correspondingly, the first environmental data may include temperature data and/or humidity data.

In step 202, the chip control unit may obtain the second environmental data of the environment where the consumable chip is currently located, determine a preset compensation value of an image forming control parameter corresponding to the second environmental data and the second preset conversion intermediate parameter corresponding to the second environmental data, perform conversion processing on the preset compensation value using the first conversion algorithm based on the second preset conversion intermediate parameter to obtain the first conversion parameter corresponding to the preset compensation value, and send the first conversion parameter to the image forming apparatus.

In one embodiment, the second detection unit such as a sensor may be configured to monitor the second environmental data of the environment where the consumable chip is currently located in real time, where the second detection unit may be arranged on the consumable chip, specifically, arranged on the circuit substrate of the consumable chip, or arranged on the consumable chip and located at the periphery of the consumable chip, or arranged on the image forming apparatus. When the consumable is installed in the image forming apparatus, the second detection unit may be located at the periphery of the consumable chip. The first environmental data and the second environmental data may be data at the same time, or a short time interval may be between the time point corresponding to the first environmental data and the time point corresponding to the second environmental data. Specifically, the time corresponding to the first environmental data and the second environmental data may be the time point corresponding to a certain time interval delayed after the image forming control unit sends a preset instruction to the consumable chip. The time interval may be set as required which is related to the communication speed between the image forming apparatus and the consumable chip, and the response speed of the consumable chip. The preset instruction may be a data read instruction, an instruction to notify the consumable chip to prepare the environmental data, or an environmental data acquisition instruction corresponding to the second environmental data obtained through the consumable chip, which may not be limited herein. The current environment may refer to the environment of the internal space enclosed by the housing of the consumable installed on the image forming apparatus. Specifically, the second detection unit may be a temperature sensor and/or a humidity sensor. Correspondingly, the second environmental data may include temperature data and/or humidity data.

The image forming control parameter may be the parameter configured to control the image forming of the image forming apparatus, including but not limited to charging voltage, transfer voltage, and developing voltage. Correspondingly, the compensation value corresponding to the image forming control parameter may be the compensation parameter corresponding to the image forming control parameter matching the environmental data, and also be the calibration parameter and the like in the color image forming manner which may not be limited herein.

In the process of determining the preset compensation value of the image forming control parameter corresponding to the second environmental data and the second preset conversion intermediate parameter corresponding to the second environmental data by the above-mentioned chip control unit, the chip control unit may, specifically, first determine the preset compensation value based on the second environmental data and the stored corresponding relationship between the environmental data and the compensation values corresponding to the image forming control parameter, and determine the second preset conversion intermediate parameter based on the second environmental data and the stored corresponding relationship between the environmental data and the conversion intermediate parameters.

It can be seen that the corresponding relationship between the environmental data and the compensation values corresponding to the image forming control parameter and the corresponding relationship between the environmental data and the conversion intermediate parameters may be preset and stored in the consumable chip; specifically, may be stored in the storage unit of the consumable chip, or may be directly stored in the computer program included in the chip control unit, which may not be limited herein.

The above-mentioned second preset conversion intermediate parameter may be understood as an encryption key, the first conversion algorithm may be understood as an encryption algorithm, and the first conversion parameter corresponding to the preset compensation value may be the encrypted preset compensation value. The chip control unit may encrypt the preset compensation value based on the second preset conversion intermediate parameter through the first conversion algorithm to obtain the first conversion parameter corresponding to the preset compensation value, that is, the preset compensation value after encryption processing, and may send the first conversion parameter to the image forming apparatus.

In step 203, the image forming control unit may receive the first conversion parameter corresponding to the preset compensation value of the image forming control parameter sent by the consumable chip; determine the first preset conversion intermediate parameter corresponding to the first environmental data; based on the first preset conversion intermediate parameter, perform conversion processing on the first conversion parameter using the preset second conversion algorithm to obtain the preset compensation value; and based on the preset compensation value and the preset image forming control parameter, determine the target image forming control parameter that satisfies a preset image forming condition using a preset algorithm.

The image forming control unit may specifically determine the first preset conversion intermediate parameter based on the first environmental data and the stored corresponding relationship between the environmental data and the conversion intermediate parameters.

It can be seen that the corresponding relationship between the environmental data and the conversion intermediate parameters may be preset and stored in the image forming apparatus, and specifically, stored in the storage unit of the image forming apparatus and may also be directly stored in the computer program included in the image forming control unit, which may not be limited herein.

The corresponding relationship between the environmental data and the conversion intermediate parameters may be pre-stored in the image forming apparatus and may be consistent with the above-mentioned corresponding relationship between the environmental data and the conversion intermediate parameters stored in the chip control unit.

Specifically, the above-mentioned first environmental data may include the first temperature data and the first humidity data; and when determining the first preset conversion intermediate parameter, the image forming control unit may first determine the temperature conversion intermediate parameter corresponding to the first temperature data based on the first temperature data and the stored corresponding relationship between the environmental data and the conversion intermediate parameters, and determine the humidity conversion intermediate parameter corresponding to the first humidity data based on the first humidity data and the stored corresponding relationship between the environmental data and the conversion intermediate parameters. The image forming control unit may perform conversion processing using the preset second conversion algorithm based on the temperature conversion intermediate parameter, the humidity conversion intermediate parameter, and the first conversion parameter to obtain the preset compensation value.

Obviously, in the above-mentioned process, in order to avoid the measurement errors between the first environmental data of the internal environment of the image forming apparatus and the second environmental data of the environment where the consumable chip is currently located affect the conversion intermediate parameter, when the image forming control unit determines the conversion intermediate parameter, the image forming control unit may adaptively determine the data range of the environment where the first environmental data is located, and try to determine the first preset conversion intermediate parameter according to each environmental data within the environmental data range; therefore, such manner may avoid the influence caused by the measurement errors.

Specifically, the image forming control unit may determine the current environmental data encoding value based on the first environmental data and the stored corresponding relationship between the environmental data and the conversion intermediate parameters; determine other environmental data encoding values adjacent to the above-mentioned current environmental data encoding value, thereby obtaining multiple encoding combinations including the current environmental data encoding value and other environmental data encoding values;

select any one encoding combination from the above-mentioned multiple encoding combinations as the above-mentioned first preset conversion intermediate parameter, perform the conversion processing on the first conversion parameter using the preset second conversion algorithm based on the first preset conversion intermediate parameter, and determine whether the preset compensation value is obtained; if not, select a next encoding combination in the multiple encoding combinations as the first preset conversion intermediate parameter, and perform the conversion processing on the above-mentioned first conversion parameter using the preset second conversion algorithm until the above-mentioned the preset compensation value is obtained or the conversion processing performed on the above-mentioned first conversion parameter using all the above-mentioned multiple encoding combinations is completed. ok Other environmental data encoding values adjacent to the current environmental data encoding value may be multiple environmental data encoding values adjacent to the current environmental data encoding value, that is, multiple environmental data encoding values adjacent to the current environmental data encoding value according to the stored corresponding relationship between the environmental data and the conversion intermediate parameters.

Specifically, when the first environmental data includes the first temperature data and the first humidity data, the image forming control unit may, based on the first environmental data and the stored corresponding relationship between the environmental data and the conversion intermediate parameters, respectively determine the current temperature encoding value matching the first temperature data and the current humidity encoding value matching the first humidity data. Next, the image forming control unit may determine other temperature encoding values adjacent to the current temperature encoding value and determine other humidity encoding values adjacent to the current humidity encoding value.

According to the current temperature encoding value, other temperature encoding values, the current humidity encoding value, and other humidity encoding values, multiple encoding combinations including any one of the temperature encoding values and any one of the humidity encoding values may be determined; any one encoding combination of the multiple encoding combinations may be selected as the first preset conversion intermediate parameter to perform the conversion processing on the first conversion parameter using the preset second conversion algorithm to determine whether the preset compensation value is obtained; if not, a next encoding combination in the multiple encoding combinations may be selected as the first preset conversion intermediate parameter to perform the conversion processing on the first conversion parameter using the preset second conversion algorithm until the preset compensation value is obtained or the conversion processing performed on the first conversion parameter using all encoding combinations in the multiple encoding combinations is completed.

In addition, in one embodiment, the above-mentioned first preset conversion intermediate parameter may be a decryption key, and the second conversion algorithm may be a decryption algorithm. After receiving the first conversion parameter corresponding to the preset compensation value, that is, the preset compensation value after the encryption processing, the image forming control unit may perform decryption processing the above-mentioned first conversion parameter based on the first preset conversion intermediate parameter using the second conversion algorithm to obtain the preset compensation value. The above-mentioned preset image forming control parameter may be set according to the performance parameter of the image forming apparatus and the performance parameter of the consumable.

In the image forming control method provided in one embodiment, the first detection unit may detect the first environmental data on the printer side, and the second detection unit may detect the second environmental data on the chip side, such that, according to the second preset conversion intermediate parameter corresponding to the second environmental data, the chip control unit may perform the encryption processing on the preset compensation value of the image forming control parameter corresponding to the second environmental data using the first conversion algorithm to obtain the first conversion parameter corresponding to the preset compensation value, and the first conversion parameter may be sent to the image forming control unit; after receiving the first conversion parameter, the image forming control unit may, based on the first preset conversion intermediate parameter corresponding to the first environmental data, perform decryption processing on the above-mentioned first conversion parameter using the second conversion algorithm to obtain the preset compensation value; and the image forming control unit may determine the target image forming control parameter according to the preset compensation value and the preset image forming control parameter. The preset compensation value may be encrypted and decrypted based on environmental data to prevent the preset compensation value from being intercepted and tampered during transmission, which may make data transmission more secure, thereby ensuring the printing and image forming quality.

Meanwhile, in order to ensure that the above-mentioned preset compensation value is obtained in time, optionally, whether the second detection unit is abnormal may be determined based on the first environmental data and the second environmental data. Specifically, before step 203, the image forming control method may further include:

sending, by the chip control unit, the second environmental data to the image forming apparatus; and determining, by the image forming apparatus, whether the second environmental data satisfies expectation based on the second environmental data and the first environmental data of the environment where the image forming apparatus is currently located.

In one embodiment, after the image forming apparatus receives the second environmental data from the chip side, the second environmental data may be compared with the first environmental data on the image forming apparatus side. If the difference between the second environmental data and the first environmental data is within a certain preset range, that is, the absolute value of the above-mentioned difference is less than or equal to the preset threshold, the second environmental data is usable, that is, no abnormality is in the second detection unit; such that, the preset compensation value corresponding to the image forming control parameter may be correctly obtained, that is, it is determined that the image forming quality that satisfies expectation may be obtained using the consumable for image forming. If it is determined that the absolute value of the above-mentioned difference is greater than the preset threshold, it is determined that the second environmental data is not usable, and the second detection unit is abnormal; such that the preset compensation value corresponding to the image forming control parameter may not be correctly obtained; and the image forming quality that satisfies expectation may not be obtained using the consumable for image forming. Therefore, it may output a prompt message indicating that the second detection unit that detects the environment where the consumable chip is located is abnormal, and the image forming quality of using the consumable may not meet expectation; and may also ask the user whether printing should continue, and whether the consumable for image forming is used may be determined according to the user's selection.

The image forming control method provided in one embodiment may determine whether the second detection unit is abnormal in time, that is, whether the sensor on the chip side is abnormal in time, which may avoid the problem that the preset compensation value corresponding to the image forming control parameter is not obtained in time resulting in printing failure or poor printing quality. In addition, when the sensor on the chip side is abnormal, whether the printing material such as toners stored in the consumable is in a desirable condition may not be determined in real time, Therefore, even if the storage condition of the printing material is poor, the consumable may still be used for printing which may cause poor image forming quality problem.

In addition, in an optional embodiment, after the image forming apparatus (also called the printer side) receives the first conversion parameter corresponding to the preset compensation value of the image forming control parameter sent by the consumable chip, there may be the case where the preset compensation value cannot be obtained after decryption processing. In such case, it can be considered that the detection unit for environmental data detection of the image forming apparatus or consumable chip may be malfunctioned, and an alarm may be issued for the above-mentioned case.

That is, if the conversion processing based on the first preset conversion intermediate parameter and the first conversion parameter using the preset second conversion algorithm does not obtain the preset compensation value, the method may also include issuing an alarm message that the consumable chip is abnormal.

In one embodiment, if the image forming control unit does not obtain the preset compensation value after decryption processing, the consumable chip may be abnormal at this point, and the image forming control unit may generate an alarm information instruction to control an alarm device to issue an alarm prompt that the consumable chip is abnormal or display a prompt message on the display unit of the image forming apparatus.

Optionally, the above-mentioned alarm device may include a buzzer and an indicator light, which may not be specifically limited herein. For example, when the image forming control unit fails to obtain the preset compensation value after the decryption process, it may generate a related alarm information instruction to control the buzzer to emit a buzzing sound and control the control indicator to emit red light.

The image forming control method provided in one embodiment may promptly alarm the consumable chip abnormality when the image forming control unit cannot obtain the preset compensation value after decryption processing, that is, when the consumable chip is abnormal, such that the user may discover the abnormality of the consumable chip in time and then repair or replace the consumable chip in time.

In order to further explain the image forming control method shown in FIG. 4, the method is described in detail hereinafter.

Figure 4:
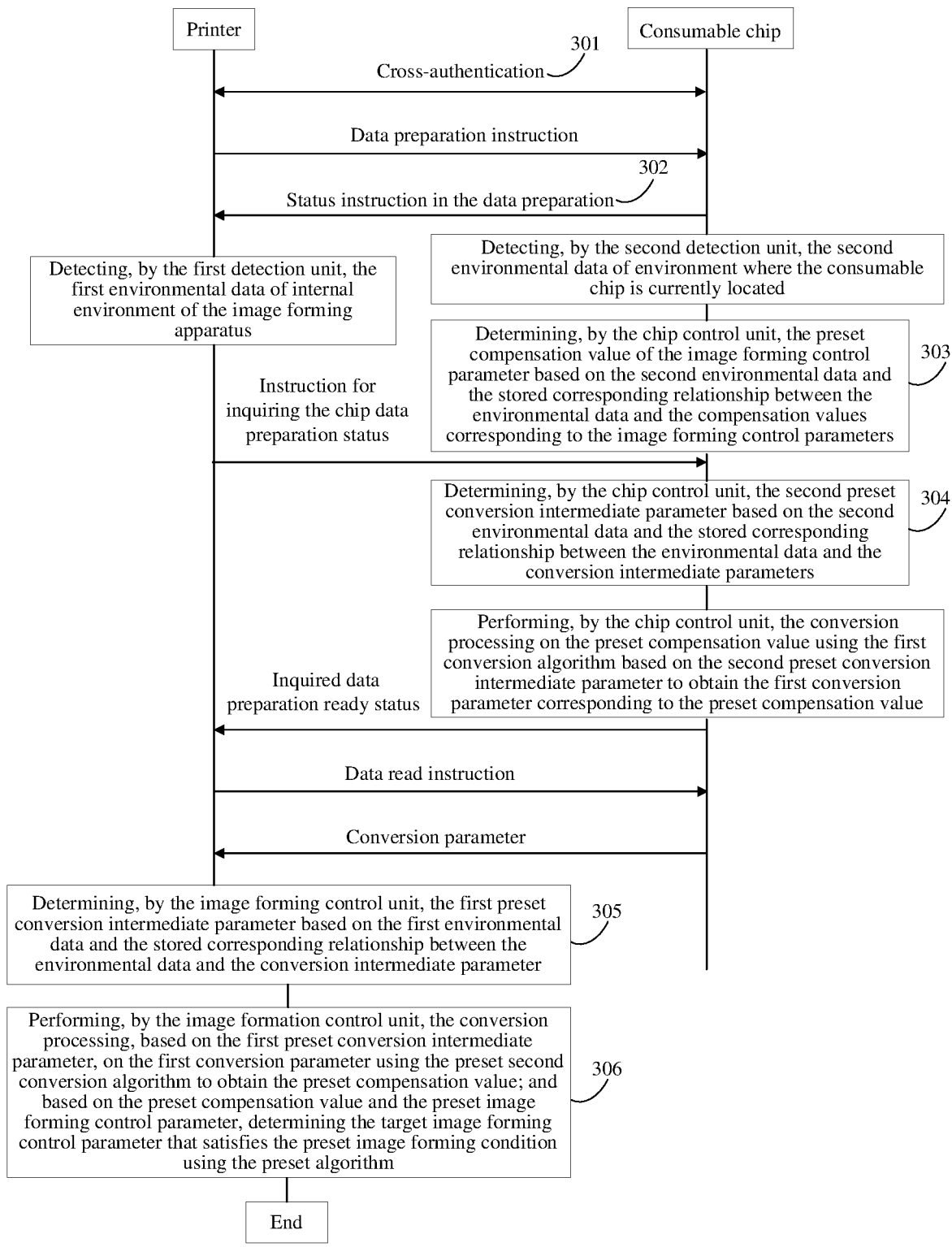
FIG. 4 illustrates a signaling exchange schematic provided by exemplary embodiments of the present disclosure.

FIG. 4 illustrates a signaling exchange schematic provided by exemplary embodiments of the present disclosure. In one embodiment, a printer may be taken an example of the image forming apparatus to introduce the information exchange between the image forming apparatus and the consumable chip. Specifically, the information exchange between the image forming control unit on the printer side and the chip control unit on the chip side may be used for description; and the environmental data may include temperature data and humidity data.

As shown in FIG. 4, the image forming control method may include the following steps.

In step 301, after the printer is started, the printer and the consumable chip may be cross-authenticated.

In one embodiment, the above-mentioned cross-authentication may include that the image forming control unit on the printer side and the chip control unit on the chip side may perform random number exchange authentication.

In step 302, the image forming control unit may send the data preparation instruction to the chip control unit; after receiving the data preparation instruction, the chip control unit may perform data preparation on the chip side and send the status instruction in the data preparation to the image forming control unit; and after receiving the status instruction in the data preparation, the image forming control unit may perform data preparation on the printer side.

In one embodiment, after receiving the data preparation instruction, the chip control unit may perform the data preparation on the chip side. The second detection unit may detect the second environmental data of the environment where the consumable chip is currently located, where the second environmental data may include the second temperature data and the second humidity data. Correspondingly, the second detection unit may include the second temperature sensor and the second humidity sensor.

Specifically, after the chip control unit receives the data preparation instruction, the second temperature sensor may detect the second temperature data of the environment where the consumable chip is currently located, and the second humidity sensor may detect the second humidity data of the environment where the consumable chip is currently located.

After receiving the status instruction in data preparation, the image forming control unit may perform the data preparation on the printer side, and the first detection unit may detect the first environmental data of the internal environment of the image forming apparatus.

Furthermore, after receiving the status instruction in data preparation, the image forming control unit may send a query instruction to the chip control unit, and the above-mentioned query instruction may specifically be an instruction to query the chip data preparation status.

In step 303, the chip control unit may determine the preset compensation value of the image forming control parameter based on the second environmental data and the stored corresponding relationship between the environmental data and the compensation values corresponding to the image forming control parameters.

In one embodiment, the corresponding relationship between the second environmental data and the stored corresponding relationship between the environmental data and the compensation values corresponding to the image forming control parameters may be a two-dimensional array relationship, that is, only one output Z may be obtained by inputting X and Y.

Specifically, the chip control unit may determine the preset compensation value based on the second temperature data, the second humidity data, and the stored corresponding relationship between the environmental data and the compensation values corresponding to the image forming control parameters, that is, the preset compensation value of the image forming control parameter may be determined according to the second temperature data and the second humidity data.

In step 304, the chip control unit may determine the second preset conversion intermediate parameter based on the second environmental data and the stored corresponding relationship between the environmental data and the conversion intermediate parameters.

Specifically, the chip control unit may determine the temperature conversion intermediate parameter, that is, the current second temperature encoding value that matches the second temperature data, corresponding to the second temperature data based on the second temperature data and the stored corresponding relationship between the environmental data and the conversion intermediate parameters; and determine the humidity conversion intermediate parameter, that is, the current second humidity encoding value that matches the second humidity data, corresponding to the second humidity data based on the second humidity data and the stored corresponding relationship between the environmental data and the conversion intermediate parameters.

Furthermore, the encoding combination may be formed according to the current second temperature encoding value and the current second humidity encoding value, thereby determining the second preset conversion intermediate parameter.

The chip control unit may perform conversion processing on the preset compensation value using the first conversion algorithm based on the second preset conversion intermediate parameter to obtain the first conversion parameter corresponding to the preset compensation value. After obtaining the first conversion parameter corresponding to the above-mentioned preset compensation value, the chip control unit may control the chip data preparation status to be displayed as a data ready status.

Furthermore, after inquiring that the chip data preparation status is displayed as the data ready status, the image forming control unit may send a data read instruction to the chip control unit; and after receiving the data read instruction, the chip control unit may send the first conversion parameter to the image forming control unit.

In step 305, the image forming control unit may determine the first preset conversion intermediate parameter based on the first environmental data and the stored corresponding relationship between the environmental data and the conversion intermediate parameter.

In one embodiment, the first environmental data may include the first temperature data and the first humidity data. Accordingly, the first detection unit may include the first temperature sensor and the first humidity sensor.

Specifically, the image forming control unit may determine the temperature conversion intermediate parameter, that is, the current temperature encoding value that matches the first temperature data, corresponding to the first temperature data based on the first temperature data and the stored corresponding relationship between the environmental data and the conversion intermediate parameters; and determine the humidity conversion intermediate parameter, that is, the current humidity encoding value that matches the first humidity data, corresponding to the first humidity data based on the first humidity data and the stored corresponding relationship between the environmental data and the conversion intermediate parameters.

Furthermore, the encoding combination may be formed according to the current first temperature encoding value and the current first humidity encoding value, thereby determining the first preset conversion intermediate parameter.

In step 306, the image forming control unit may perform conversion processing, based on the first preset conversion intermediate parameter, on the first conversion parameter using the preset second conversion algorithm to obtain the preset compensation value; and based on the preset compensation value and the preset image forming control parameter, may determine the target image forming control parameter that satisfies the preset image forming condition using the preset algorithm.

For example, Table 1 is a temperature range table of the corresponding relationship between environmental data and conversion intermediate parameters provided by the present disclosure; and Table 2 is a humidity range table of the corresponding relationship between the environmental data and the conversion intermediate parameters provided by the present disclosure.

TABLE 1

Temperature range table

| Range code number | Temperature range |
| --- | --- |
| 0x0001 | −100° C.~−80° C. |
| 0x0002 | −80° C.~−60° C. |
| 0x0003 | −60° C.~−40° C. |
| 0x0004 | −40° C.~−20° C. |
| 0x0005 | −20° C.~−10° C. |
| 0x0006 | −10° C.~−5° C. |
| 0x0007 | −5° C.~0° C. |
| 0x0008 | 0° C.~5° C. |
| 0x0009 | 5° C.~10° C. |
| 0x0010 | 10° C.~12° C. |
| 0x0011 | 12° C.~14° C. |
| 0x0012 | 14° C.~16° C. |

TABLE 1-continued

Temperature range table

| Range code number | Temperature range |
| --- | --- |
| 0x0013 | 16° C.~18° C. |
| 0x0014 | 18° C.~20° C. |
| 0x0015 | 20° C.~22° C. |
| 0x0016 | 22° C.~24° C. |
| 0x0017 | 24° C.~26° C. |
| 0x0018 | 26° C.~28° C. |
| 0x0019 | 28° C.~30° C. |
| 0x0020 | 30° C.~32° C. |
| 0x0021 | 32° C.~34° C. |
| 0x0022 | 34° C.~36° C. |
| 0x0023 | 36° C.~38° C. |
| 0x0024 | 38° C.~40° C. |
| 0x0025 | 40° C.~42° C. |
| 0x0026 | 42° C.~44° C. |
| 0x0027 | 44° C.~46° C. |
| 0x0028 | 46° C.~48° C. |
| 0x0029 | 48° C.~50° C. |
| 0x0030 | 50° C.~55° C. |
| 0x0031 | 55° C.~60° C. |
| 0x0032 | 60° C.~70° C. |

TABLE 2

Humidity range table

| Range code number | Humidity range |
| --- | --- |
| 0xFF00 | 0%~10% |
| 0xFE00 | 10%~20% |
| 0xFD00 | 20%~30% |
| 0xFC00 | 30%~40% |
| 0xFB00 | 40%~50% |
| 0xFA00 | 50%~60% |
| 0xF900 | 60%~70% |
| 0xF800 | 70%~80% |
| 0xF700 | 80%~90% |
| 0xF600 | 90%~100% |

On the consumable chip side, the second environmental data of the current environment of the consumable chip detected by the second detection unit may include the second temperature data of 30 degrees and the second humidity data of 25%, such that the current temperature encoding value 0x0019 may be determined according to Table 1 and the second environmental data, and the current humidity encoding value 0xFD00 may be determined according to the second environmental data and Table 2. Therefore, the current humidity encoding value and the current temperature encoding value may be determined, thereby determining the second preset conversion intermediate parameter.

The manner for determining the first preset conversion intermediate parameter at the printer side may be same as the manner determining the second preset conversion intermediate parameter at the chip side, which may not be described in detail herein.

Therefore, the chip control unit may generate the first conversion parameter using the preset algorithm based on the determined second preset conversion intermediate parameter and the preset compensation value of the image forming control parameter, and send the first conversion parameter to the printer; and the printer may generate the preset compensation value using the preset algorithm based on the determined first preset conversion intermediate parameter and the first conversion parameter, thereby determining the target image forming control parameter.

In the above-mentioned manner of determining the target image forming control parameter, the second preset conversion intermediate parameter corresponding to the consumable chip side and the first preset conversion intermediate parameter corresponding to the printer side may correspond to each other. In order to avoid the measurement errors between the first environmental data of the internal environment of the image forming apparatus and the second environmental data of the environment where the consumable chip is currently located affect the conversion intermediate parameter, when the image forming control unit determines the conversion intermediate parameter, the image forming control unit may adaptively determine the data range of the environmental where the first environmental data is located, and try to determine the first preset conversion intermediate parameter according to each environmental data within the environmental data range; therefore, such manner may avoid the influence caused by the measurement errors.

For example, according to the current temperature encoding value, a previous temperature encoding value and a next temperature encoding value adjacent to the current temperature encoding value may be determined; and according to the current humidity encoding value, a previous humidity encoding value and a next humidity encoding value adjacent to the current humidity encoding value may be determined. According to the current temperature encoding value, the previous temperature encoding value and the next temperature encoding value, and also according to the current humidity encoding value, the previous humidity encoding value and the next humidity encoding value, multiple encoding combinations including any temperature encoding value and any humidity encoding value may be determined.

For example, according to Table 1 and Table 2, the current temperature encoding value, the previous temperature encoding value, and the next temperature encoding value are 0x0011, 0x0010, and 0x0012, respectively; and the current humidity encoding value, the previous humidity encoding value and the next humidity encoding value are respectively 0xFB00, 0xFA00, 0xFC00. Therefore, the obtained multiple encoding combinations may include 0x00100xFA00, 0x00100xFB00, 0x001000xFC00, 0x001000xFA00, 0x001000xFB00, 0x001000xFC00, 0x00120xFA00, 0x00120xFB00, and 0x00120xFC00.

Any encoding combination of the above-mentioned multiple encoding combinations may be selected as the first preset conversion intermediate parameter to perform conversion processing on the first conversion parameter using the preset second conversion algorithm and determine whether the preset compensation value is obtained. If not, the next encoding combination in the multiple encoding combinations may be selected as the first preset conversion intermediate parameter, and conversion processing may be performed on the first conversion parameter using the preset second conversion algorithm until the preset compensation value is obtained or the conversion processing performed on the first conversion parameter using all encoding combinations is completed.

That is, finally, based on the first preset conversion intermediate parameter, the conversion processing may be performed on the first conversion parameter using the preset second conversion algorithm to obtain the preset compensation value; and based on the preset compensation value and the preset image forming control parameter, the target image forming control parameter that satisfies the preset image forming condition may be determined using the preset algorithm.

Or, if the printer completes processing the first conversion parameter with the second conversion algorithm using all encoding combinations, the preset compensation value is not obtained. Therefore, the first detection unit and/or the second detection unit may be abnormal, that is, the sensor on the printer side and/or the sensor on the chip side may be abnormal. At this point, an alarm may be issued to remind the user to check and replace the above-mentioned sensors in time.

At this point, the printer and the consumable chip may have completed the exchange.

For the image forming control method provided by embodiments of the present disclosure, the encryption and decryption processing and transmission may be performed on the preset compensation value of the image forming control parameter based on the environmental data using the environmental data detected by the consumable chip and the image forming apparatus. The preset compensation value may be prevented from being intercepted and tampered during transmission, which may make data transmission more secure, thereby ensuring the printing and image forming quality.

Embodiment Two

Various embodiments of the present disclosure provide an image forming control method, applied to a consumable chip. The consumable chip is installed on a consumable, and the consumable is detachably installed on an image forming apparatus. The method may include obtaining second environmental data of environment where the consumable chip is currently located; and determining a preset compensation value of an image forming control parameter corresponding to the second environmental data and a second preset conversion intermediate parameter corresponding to the second environmental data; generating a first conversion parameter based on the preset compensation value and the second preset conversion intermediate parameter; and sending the first conversion parameter to the image forming apparatus, wherein the first conversion parameter is configured to determine a target image forming control parameter that satisfies a preset image forming condition.

In some exemplary embodiments of the present disclosure, the method may further include sending the second environmental data to the image forming apparatus; wherein the second environmental data is configured to combine with first environmental data to determine whether the second environmental data satisfies expectation; and the first environmental data is environmental data of internal environment of the image forming apparatus.

In some exemplary embodiments of the present disclosure, determining the preset compensation value of the image forming control parameter corresponding to the second environmental data and the second preset conversion intermediate parameter corresponding to the second environmental data may include determining the preset compensation value based on the second environmental data and a stored corresponding relationship between environmental data and compensation values corresponding to image forming control parameters.

In some exemplary embodiments of the present disclosure, determining the preset compensation value of the image forming control parameter corresponding to the second environmental data and the second preset conversion intermediate parameter corresponding to the second environmental data may include determining the second preset conversion intermediate parameter based on the second environmental data and a stored corresponding relationship between environmental data and conversion intermediate parameters.

In some exemplary embodiments of the present disclosure, after sending the first conversion parameter to the image forming apparatus, the method may further include receiving a second conversion parameter generated by data to-be-written which is to be written to the consumable chip, verification data configured to determine correctness of the data to-be-written, and a third preset conversion intermediate parameter; and sending preset response information to the image forming apparatus based on the second conversion parameter, wherein the preset response information is configured to determine whether the data to-be-written has been successfully written to the consumable chip.

In some exemplary embodiments of the present disclosure, before sending the preset response information to the image forming apparatus, the method may further include obtaining a preset codebook and fourth environmental data corresponding to the consumable chip and determining the preset response information based on the fourth environmental data, the preset codebook, and the second conversion parameter.

In some exemplary embodiments of the present disclosure, determining the preset response information based on the fourth environmental data, the preset codebook, and the second conversion parameter may include determining a fourth preset conversion intermediate parameter based on the fourth environmental data, the preset codebook, and a stored corresponding relationship between environmental data and conversion intermediate parameters; performing conversion processing on the second conversion parameter based on the fourth preset conversion intermediate parameter, and determining whether the conversion processing is successful; if not, sending prompt information indicating that the conversion processing is failed to an image forming control unit; and if yes, sending a third conversion parameter to the image forming control unit, wherein the third conversion parameter is configured to determine whether the data to-be-written has been correctly written to the consumable chip.

In some exemplary embodiments of the present disclosure, determining the fourth preset conversion intermediate parameter based on the fourth environmental data, the preset codebook, and the stored corresponding relationship between the environmental data and the conversion intermediate parameters may include determining a current environmental data encoding value based on the fourth environmental data and the stored corresponding relationship between the environmental data and the conversion intermediate parameters; determining other environmental data encoding values adjacent to the current environmental data encoding value, thereby obtaining multiple encoding combinations including the current environmental data encoding value and the other environmental encoding values; and generating the fourth preset conversion intermediate parameter based on any one encoding combination of the multiple encoding combinations.

In some exemplary embodiments of the present disclosure, performing the conversion processing on the second conversion parameter based on the fourth preset conversion intermediate parameter may include using the fourth preset conversion intermediate parameter corresponding to any one encoding combination of the multiple encoding combinations to perform the conversion processing on the second conversion parameter, and determining whether the conversion processing is successful; if not, performing the conversion processing on the second conversion parameter based on a fourth preset conversion intermediate parameter corresponding to a next encoding combination in the multiple encoding combinations until it determines the conversion processing is successful or the conversion processing performed on the second conversion parameter using fourth preset conversion intermediate parameters corresponding to all encoding combinations in the multiple encoding combinations is completed.

Embodiment Three

Normally, after the image forming operation is completed, the image forming apparatus may also need to write data such as the page number of printed paper and toner consumption and the like into the consumable chip. However, in the existing technology, the image forming apparatus and the consumable chip may normally communicate by exchanging cipher codes, which can easily be intercepted for analysis and tampering. As a result, the consumable chip may incorrectly record information about the lifetime of the consumable which may result in incorrect determination of the lifetime of the consumable; the user cannot be correctly prompted to replace the consumable, causing inconvenience to the user; and it may cause the problems that the consumable that has not reached the end of its lifetime is mistakenly considered to be expired and the user is prompted to replace the consumable, and/or the consumable that approaches its lifetime is mistakenly considered that it can continue to be used, and the user is not prompted to replace the consumable in time.

In order to solve the above-mentioned technical problem, as shown in FIG. 7, embodiments of the present disclosure provide an image forming control method, including the following steps.

In step 701, the image forming control unit may obtain the data to-be-written which is to be written into the consumable chip and the verification data configured to determine the correctness of the data to-be-written; and generate the second conversion parameter based on the above-mentioned data to-be-written, the above-mentioned verification data and the third preset conversion intermediate parameter and send the above-mentioned second conversion parameter to the consumable chip.

After the image forming apparatus completes the execution of the image forming operation, the image forming control unit may obtain the above-mentioned data to-be-written and the verification data configured to determine the correctness of the data to-be-written; and the above-mentioned data to-be-written may include, but may not be limited to, the number of printed pages, print size, toner consumption, average coverage and the like, which may not be limited herein.

Embodiments of the present disclosure may not limit the manner for how to use the verification data to verify whether the data to-be-written is correct; and the above-mentioned verification data may be parity verification data, CRC verification data, and the like.

The above-mentioned second preset conversion intermediate parameter may be specifically obtained by executing the following steps:
  obtaining a preset codebook;
  obtaining the first preset key index value; and
  generating the third preset intermediate parameter based on the preset codebook and the first preset key index value.

Specifically, embodiments of the present disclosure may not limit the manner for obtaining the preset codebook by the image forming apparatus. The preset codebook may be directly generated by the image forming apparatus according to a preset rule as required, such as using a random number generator to generate the preset codebook or may be acquired by the image forming control unit through communication with the consumable chip or other computer equipment connected to the image forming apparatus.

The above-mentioned preset codebook may be in one-dimensional form, specifically, may be data with a fixed byte length. For example, the preset codebook may be data composed of 0 and 1 with a byte length of 255.

The above-mentioned preset codebook may also be set into two-dimensional and three-dimensional forms as required. For example, when the preset codebook is in a two-dimensional form, a certain length of data may be set in the horizontal direction and a certain length of data may be set in the vertical direction of the preset codebook.

In one embodiment of the present disclosure, the determination of the first preset key index value may be related to the data of the internal environment in the image forming apparatus.

Specifically, the corresponding environmental data encoding value may be determined based on the data of the internal environment corresponding to the image forming apparatus, and the pre-stored corresponding relationship between the environmental data and the preset intermediate parameters; and the first preset key index value may be determined based on the environmental data encoding value.

Furthermore, the determination of the first preset key index value may also be related to the above-mentioned environmental data encoding value and the preset count information corresponding to the data write instruction sent by the image forming apparatus to the consumable chip. The preset count information may specifically be the data write sequence number corresponding to the current data write instruction, which may be referred to as the data write sequence number for short in the following. That is, the first preset key index value may be generated according to a preset algorithm based on the above-mentioned environmental data encoding value and the data write sequence number.

Furthermore, when the preset codebook is in one-dimensional form, in embodiments of the present disclosure, the above-mentioned key index value may also be determined based on the above-mentioned environmental data encoding value, the data write sequence number, the byte length of the preset codebook, and the sequence number of the consumable chip, thereby determining the above-mentioned third preset conversion intermediate parameter.

As a result, the image forming apparatus may send each data write instruction to the consumable chip. Each data write instruction corresponds to a different data write sequence number, such that even if the environmental data detected by the image forming apparatus is same for different data write instructions, the first preset key index values corresponding to the above-mentioned data write instructions may also be different. Therefore, the third preset intermediate parameters corresponding to the above-mentioned data write instructions may also be different. The above-mentioned preset count information may also be replaced with other data, for example, may be dynamic parameters that change with the time information of the data write instructions sent by the image forming apparatus to the consumable chip and the like, as long as the first preset key index values generated corresponding to different data write instructions are different.

For example, it assumes that the preset codebook is one-dimensional data, the byte length is L, the data write sequence number is N, the serial number of the consumable chip is SN, the third environmental data detected by the image forming apparatus is T1, and the fourth environmental data detected by the consumable chip is T2. The third environmental data T1 and the fourth environmental data T2 may be data at the same time, or a small time interval may be between the time points corresponding to the third environmental data T1 and the fourth environmental data T2. Such time may be a time point corresponding to a certain time interval delayed after the image forming control unit sends the preset instruction to the consumable chip. The time interval may be set as required and related to the communication speed between the image forming apparatus and the consumable chip, and the response speed of the consumable chip. The preset instruction may be an instruction for notifying the consumable chip to prepare environmental data and the like, which may not be limited herein. It should be understood that the time points of the above-mentioned third environmental data T1 and the fourth environmental data T2 may be different from the above-mentioned detected time points of the first environmental data and the second environmental data.

In one embodiment of the present disclosure, it should be understood that the third preset conversion intermediate parameter may be specifically an encryption key.

The image forming control unit may first determine the encoding value K1 corresponding to the third environmental data T1 based on the third environmental data T1 and the pre-stored corresponding relationship between the environmental data and the preset intermediate parameters; then, the key index value may be generated based on the encoding value K1, the serial number SN of the consumable chip, the data write sequence number N, and the byte length L of the preset codebook; and the corresponding key, that is, the third preset conversion intermediate parameter, may be determined based on the key index value and the preset codebook.

For example, the ciphertext data write number N is 0x01, the serial number SN of the consumable chip is AA2A0000000000000000000000000000, the encoding value K1 is 0x3F; and the above-mentioned preset key index value may be determined by performing the following steps.

At step 1, XOR operation may be performed on the ciphertext data write number N and the serial number SN to obtain (AB2B01010101010101010101010101);

at step 2, XOR operation may be performed on the data obtained in step 1 and the encoding value 0x3F to obtain (94143E3E3E3E3E3E3E3E3E3E3E3E3E3E); and at step 3, the obtained value may be used as the key index, that is, INDEX=(0x94,0x14,0x3E,0x3E,0x3E,0x3E, 0x3E,0x3E,0x3E,0x3E,0x3E,0x3E,0x3E,0x3E,0x3E, 0x3E). After the determination of the first preset key index value is completed, the byte data of INDEX[n]% L bit may be taken out from the codebook with the byte length L as the n-th byte of the third preset intermediate parameter P.

It should be noted that the process of determining the environmental data encoding value by the image forming control unit based on the environmental data, the stored corresponding relationship between the environmental data and the preset intermediate parameters may refer to the description of above-mentioned embodiments, which may not be limited in detail herein.

After determination of the third preset conversion intermediate parameter is completed, the image forming control unit may generate the second conversion parameter based on the above-mentioned data to-be-written, the above-mentioned verification data, and the above-mentioned preset conversion intermediate parameter; and send the second conversion parameter to the consumable chip.

It should be understood that the above-mentioned data to-be-written and the verification data corresponding to the above-mentioned data to-be-written may form complete data according to a preset rule, where previous multiple consecutive bytes corresponding to the complete data may be the above-mentioned data to-be-written, and subsequent multiple consecutive bytes corresponding to the complete data may be the verification data corresponding to the above-mentioned data to-be-written.

At step 702, the consumable chip may send preset response information to the image forming control unit based on the second conversion parameter. The preset response information may be configured to determine whether the data to-be-written has been successfully written to the consumable chip.

After receiving the second conversion parameter sent by the image forming control unit, the consumable chip may send the preset response information to the image forming control unit; and after receiving the preset response information, the image forming control unit may use the third conversion intermediate parameter to perform conversion processing on the preset response information, and may determine whether the data to-be-written has been successfully written to the consumable chip according to the result of the conversion processing.

Figure 8:
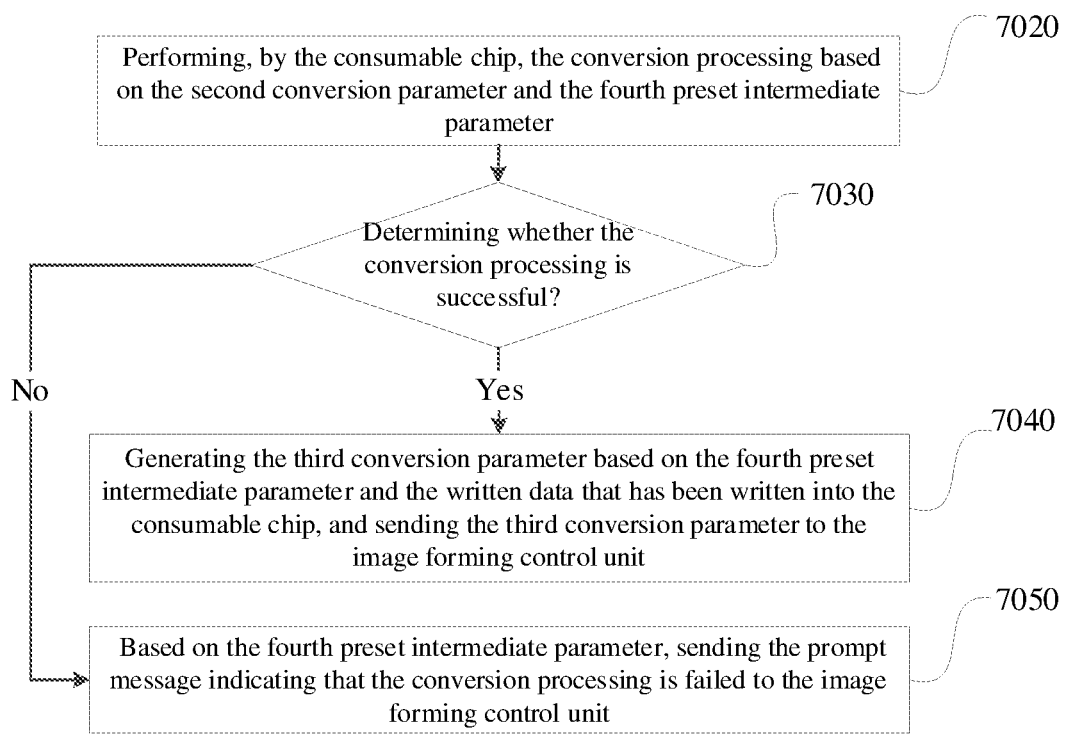
FIG. 8 illustrates a flowchart of another image forming control method provided by exemplary embodiments of the present disclosure.

As shown in FIG. 8, step 702 may specifically include the following steps.

At step 7020, the consumable chip may receive the second conversion parameter, and perform conversion processing based on the second conversion parameter and the fourth preset intermediate parameter.

At step 7030, whether the conversion processing is successful may be determined.

If yes, execute step 7040; and if not, execute step 7050.

At step 7040, the third conversion parameter may be generated based on the fourth preset intermediate parameter and the written data that has been written into the consumable chip, and the third conversion parameter may be sent to the image forming control unit.

At step 7050, based on the fourth preset intermediate parameter, a prompt message indicating that the conversion processing is failed may be sent to the image forming control unit.

In step 7020, the determination of the fourth preset intermediate parameter may also be related to the fourth environmental data corresponding to the consumable chip and the preset codebook received from the image forming apparatus.

The above-mentioned fourth preset intermediate parameter may be determined by performing the following steps:
  receiving the preset codebook sent by the image forming apparatus;
  obtaining the second preset key index value; and
  generating the fourth preset intermediate parameter based on the preset codebook and the second preset key index value.

The determination of the second preset key index value may be related to the fourth environmental data corresponding to the consumable chip.

The manner of generating the second preset key index value may be similar to that of the above-mentioned first preset key index, and the difference is based on different environmental data, which may not be described in detail herein.

In one embodiment of the present disclosure, it should be understood that the above-mentioned fourth preset conversion intermediate parameter may specifically be a decryption key.

The generation of the fourth preset conversion parameter may be based on the above-mentioned current environmental data encoding value. Also, other environmental data encoding values adjacent to the current environmental data encoding value may be determined based on the current environmental data encoding value, such that multiple encoding combinations including the current environmental data encoding value and other environmental data encoding values may be obtained; and one encoding combination may be selected from the multiple encoding combinations to generate the fourth preset intermediate parameter according to the above-mentioned manner, such that the fourth preset intermediate parameter corresponding to the above-mentioned multiple encoding combinations may be obtained.

It should be understood that the process of determining the current environmental data encoding value and/or other environmental data encoding values according to the environmental data may be similar to the process of determining the current environmental data encoding value and/or other environmental data encoding values by the image forming apparatus according to the environmental data in the above-mentioned embodiments, which may not be described in detail herein.

In step 7020, when the fourth preset intermediate parameter is generated based only on the above-mentioned current environment encoding value, the consumable chip may use the fourth preset conversion intermediate parameter to perform conversion processing on the second conversion parameter to obtain the converted result data; the data to-be-written and the verification data in the result data may be identified according to the composition form of the above-mentioned data to-be-written and the verification data corresponding to the data to-be-written, and the verification data may be configured to verify the data to-be-written; if the verification is successful, it may determine that the conversion processing of the second conversion parameter is successful; and if the verification fails, it may determine that the conversion processing of the second conversion parameter is failed.

In embodiments of the present disclosure, the encoding combination may also be selected from the above-mentioned multiple encoding combinations, and the fourth preset intermediate parameter corresponding to the encoding combination may be obtained; the fourth preset intermediate parameter may be configured to perform conversion processing on the second conversion parameter, and whether the current conversion processing is successful may be determined; if not, a next encoding combination of the multiple encoding combinations may be configured to generate the corresponding fourth preset intermediate parameter, and then the fourth preset intermediate parameter may be configured to perform conversion processing on the second conversion parameter until it determines that the conversion processing is successful, or the conversion processing performed on the second conversion parameter using the fourth preset intermediate parameters corresponding to all encoding combinations is completed.

If the conversion processing performed on the second conversion parameter by the fourth preset intermediate parameter corresponding to one encoding combination in the above-mentioned multiple encoding combinations is successful, it may determine that the conversion processing on the second conversion parameter is successful; and if the conversion processing result performed on the second conversion parameter by the fourth preset intermediate parameters corresponding to all encoding combinations in the above-mentioned multiple encoding combinations fails, it may determine that the conversion processing on the second conversion parameter is failed.

It should be understood that, in one embodiment of the present disclosure, the conversion processing may specifically be a decryption processing.

If it determines that the conversion processing of the second conversion parameter is failed, it may determine that the preset response information is the prompt message indicating that the conversion processing is failed, and the preset response information may be plain text data.

If it determines that the conversion processing of the second conversion parameter is successful, it may determine that the preset response information may be the third conversion parameter generated by encrypting the written data that has been written to the consumable chip using the fourth preset intermediate parameter; after receiving the third conversion parameter, the image forming apparatus may use the third conversion intermediate parameter to perform conversion processing on the third conversion parameter, and compare the converted data with the above-mentioned data to-be-written to determine whether the data to-be-written is correctly written into the consumable chip; and if yes, this data write operation may be terminated.

In one embodiment of the present disclosure, when writing data to the consumable chip, the data to-be-written may be encrypted, decrypted and transmitted using the environmental data detected by the consumable chip and the image forming apparatus respectively. In such way, it may avoid that during the process of transmitting and writing the data to-be-written into the consumable chip by the image forming apparatus, the lifetime of the consumable may be incorrectly determined caused by malicious tampering of the data to-be-written, which may easily cause the problems that the consumable that has not reached the end of its lifetime is mistakenly considered to be expired and the user is prompted to replace the consumable, and/or the consumable that approaches its lifetime is mistakenly considered that it can continue to be used, and the user is not prompted to replace the consumable in time.

Embodiment Four

FIG. 5 illustrates a structural schematic of an image forming apparatus provided by exemplary embodiments of the present disclosure. As shown in FIG. 5, the image forming apparatus provided by one embodiment may include a first detection unit 41, a second detection unit 42, and an image forming control unit 43. The image forming apparatus may be detachably installed with the consumable, the consumable may be installed with the consumable chip, and the consumable chip may include a chip control unit 44.

The first detection unit 41 may be configured to detect and obtain the first environmental data of the internal environment of the image forming apparatus.

The second detection unit 42 may be configured to detect the second environmental data of the environment where the consumable chip is currently located.

The chip control unit 44 may be configured to obtain the second environmental data of the environment where the consumable chip is located; determine the preset compensation value corresponding to the image forming control parameter which corresponds to the second environmental data and the second preset conversion intermediate parameter corresponding to the second environmental data; generate the first conversion parameter based on the preset compensation value and the second preset conversion intermediate parameter; and send the first conversion parameter to the image forming control unit 43.

The image forming control unit 43 may be configured to receive the first conversion parameter corresponding to the preset compensation value of the image forming parameter sent by the consumable chip; determine the first preset conversion intermediate parameter corresponding to the first environmental data; based on the first preset conversion intermediate parameter, perform conversion processing on the first conversion parameter using the preset second conversion algorithm to obtain the preset compensation value; and based on the preset compensation value and the preset image forming control parameter, determine the target image forming control parameter that satisfies the preset image forming condition using the preset algorithm.

Embodiment Five

FIG. 6 illustrates a structural schematic of a consumable chip provided by exemplary embodiments of the present disclosure. As shown in FIG. 6, the consumable chip provided in one embodiment may include a chip control unit 51.

The chip control unit 51 may be configured to obtain the second environmental data of the environment where the consumable chip is currently located, determine the preset compensation value of the image forming control parameter corresponding to the second environmental data and the second preset conversion intermediate parameter corresponding to the second environmental data, perform conversion processing on the above-mentioned preset compensation value using the first conversion algorithm based on the second preset conversion intermediate parameter to obtain the first conversion parameter corresponding to the preset compensation value, and send the first conversion parameter to the image forming apparatus. The first conversion parameter may be configured to determine the target image forming control parameter that satisfies the preset image forming condition.

In an optional implementation manner, the chip control unit 51 may further specifically be configured to:
  obtain the second environmental data corresponding to the environment where the consumable chip is currently located and send the second environmental data to the image forming apparatus, where the second environmental data may be configured to determine whether the second environmental data satisfies expectation in combination with the first environmental data.

In an optional implementation manner, when determining the preset compensation value corresponding to the image forming control parameter corresponding to the second environmental data, the chip control unit 51 may be further specifically configured to:
  determine the preset compensation value based on the second environmental data and the stored corresponding relationship between the environmental data and the compensation values corresponding to the image forming control parameters.

In an optional implementation manner, when determining the preset conversion intermediate parameter corresponding to the second environmental data, the chip control unit 51 may be further specifically configured to:
  determine the second preset conversion intermediate parameter based on the second environmental data and the stored corresponding relationship between the environmental data and the conversion intermediate parameters.

In an optional implementation manner, the chip control unit 51 may be configured to receive, the second conversion parameter generated based on the third preset conversion intermediate parameter, the data to-be-written which is to be written into the consumable chip, and the verification data configured to determine the correctness of the above-mentioned data to-be-written, and send the preset response information to the image forming control unit based on the above-mentioned second conversion parameter. The above-mentioned preset response information is configured to determine whether the above-mentioned data to-be-written has been correctly written to the above-mentioned consumable chip.

In an optional implementation manner, before sending the preset response information to the image forming control unit, the chip control unit 51 may be specifically configured to obtain the preset codebook and the fourth environmental data corresponding to the consumable chip and determine the preset response information based on the fourth environmental data, the preset codebook, and the second conversion parameter.

In an optional implementation manner, the chip control unit 51 may be specifically configured to determine the fourth preset conversion intermediate parameter based on the fourth environmental data, the preset codebook and the stored corresponding relationship between the environmental data and the conversion intermediate parameters; perform conversion processing based on the fourth preset conversion intermediate parameter and the second conversion parameter, and determine whether the conversion processing is successful; if not, send prompt information indicating that the conversion processing is failed to the image forming control unit; and if yes, send the third conversion parameter to the image forming control unit, where the third conversion parameter may be configured to determine whether the data to-be-written has been correctly written to the consumable chip.

In an optional implementation manner, the chip control unit 51 may be specifically configured to determine the current environmental data encoding value based on the fourth environmental data and the stored corresponding relationship between the environmental data and the conversion intermediate parameters; determine other environmental data encoding values adjacent to the above-mentioned current environmental data encoding value to obtain multiple encoding combinations including the current environmental data encoding value and other environmental encoding values; and generate the fourth preset conversion intermediate parameter based on one encoding combination of the above-mentioned multiple encoding combinations.

In an optional implementation manner, the above-mentioned chip control unit 51 may be specifically configured to use the above-mentioned fourth preset conversion intermediate parameter corresponding to any one encoding combination of the above-mentioned multiple encoding combinations to perform conversion processing on the above-mentioned second conversion parameter, and determine whether the above-mentioned conversion processing is successful; if not, perform conversion processing on the second conversion parameter based on the fourth preset conversion intermediate parameter corresponding to a next encoding combination in the multiple encoding combinations until it determines that the above-mentioned conversion processing is successful; or the conversion processing performed on the second conversion parameter using fourth preset conversion intermediate parameters corresponding to all encoding combinations in the multiple encoding combinations is completed.

In an optional implementation manner, the above-mentioned chip control unit 51 may further include the second detection unit for detecting the second environmental data of the environment where the consumable chip is located.

Embodiments of the present disclosure also provide a consumable including a housing, a developer accommodating portion, and the above-mentioned consumable chip. The developer accommodating portion may be located inside the housing and used for accommodating a developer. The consumable chip may be disposed on the housing.

In one embodiment, the consumable may further include a developer conveying element, and the developer conveying element may be configured to convey the developer.

In one embodiment, the consumable may further include a photosensitive drum and a charging roller, and the charging roller may be configured to charge the photosensitive drum.

In one embodiment, the consumable may further include the second detection unit for detecting the second environmental data of the environment where the consumable chip is located.

Embodiments of the present disclosure also provide another consumable including a photosensitive drum, a charging roller, and a consumable chip. The charging roller may be configured to charge the photosensitive drum.

In one embodiment, the consumable may further include the second detection unit for detecting the second environmental data of the environment where the consumable chip is located.

The above are only optional embodiments of the present disclosure and are not configured to limit the present disclosure. For those skilled in the art, the present disclosure may have various modifications and changes. Any modification, equivalent replacement, improvement and the like made within the spirit and principle of the present disclosure shall be included in the scope of protection of the present disclosure.

What is claimed is:

1. An image forming control method, applied to a consumable chip, wherein the consumable chip is installed on a consumable, and the consumable is detachably installed on an image forming apparatus, the method comprising:
   receiving a conversion parameter sent by the image forming apparatus, wherein the received conversion parameter is generated by data to-be-written which is to be written to the consumable chip, verification data configured to determine correctness of the data to-be-written, and a preset conversion intermediate parameter corresponding to the image forming apparatus;
   obtaining a preset codebook and determining response information based on the preset codebook and the received conversion parameter; and
   sending the response information to the image forming apparatus,
   wherein determining the response information based on the preset codebook and the received conversion parameter comprises:
      determining a preset conversion intermediate parameter corresponding to the consumable chip based on the preset codebook, wherein the preset conversion intermediate parameter corresponding to the consumable chip is corresponding to an environmental data of an environment where the consumable chip is currently located based on the preset codebook;
      performing conversion processing on the received conversion parameter based on the preset conversion intermediate parameter corresponding to the consumable chip; and
      determining the response information based on a result of the conversion processing.

2. The image forming control method according to claim 1, wherein determining the preset conversion intermediate parameter corresponding to the consumable chip based on the preset codebook comprises:
   obtaining the environmental data where the consumable chip is currently located; and
   determining the preset conversion intermediate parameter corresponding to the consumable chip based on the environmental data, the preset codebook, and a stored corresponding relationship between environmental data and conversion intermediate parameters.

3. The image forming control method according to claim 1, wherein sending the response information to the image forming apparatus comprises:
   if the conversion processing is unsuccessful, sending prompt information indicating that the conversion processing is failed to the image forming apparatus; and
   if the conversion processing is successful, sending the conversion parameter obtained through the conversion processing to the image forming apparatus.

4. The image forming control method according to claim 2, wherein determining the preset conversion intermediate parameter corresponding to the consumable chip based on the environmental data, the preset codebook, and the stored corresponding relationship between the environmental data and the conversion intermediate parameters comprises:
   determining a current environmental data encoding value based on the environmental data and the stored corresponding relationship between the environmental data and the conversion intermediate parameters;
   determining other environmental data encoding values adjacent to the current environmental data encoding value, thereby obtaining multiple encoding combinations including the current environmental data encoding value and the other environmental encoding values; and
   generating the preset conversion intermediate parameter corresponding to the consumable chip based on any one encoding combination of the multiple encoding combinations.

5. The image forming control method according to claim 4, wherein performing the conversion processing on the received conversion parameter based on the preset conversion intermediate parameter corresponding to the consumable chip comprises:
   using the corresponding to any one encoding combination of the multiple encoding combinations to perform the conversion processing on the received conversion parameter, and determining whether the conversion processing is successful; and if the conversion processing is unsuccessful, performing the conversion processing on the received conversion parameter based on the preset conversion intermediate parameter corresponding to the consumable chip corresponding to a next encoding combination in the multiple encoding combinations until it is determined the conversion processing is successful or the conversion processing performed on the received conversion parameter using the preset conversion intermediate parameters corresponding to the consumable chip corresponding to all encoding combinations in the multiple encoding combinations is completed.

6. The image forming control method according to claim 1, wherein performing the conversion processing on the received conversion parameter based on the preset conversion intermediate parameter corresponding to the consumable chip comprises:

performing the conversion processing on the received conversion parameter based on the preset conversion intermediate parameter corresponding to the consumable chip to obtain the converted result data; and identifying the data to-be-written in the converted result data.

7. The image forming control method according to claim 6, further comprising:

saving the data to-be-written.

8. The image forming control method according to claim 6, wherein determining the preset conversion intermediate parameter corresponding to the consumable chip based on the preset codebook comprises:

determining a decryption key based on the preset codebook; and performing the conversion processing on the received conversion parameter based on the preset conversion intermediate parameter corresponding to the consumable chip to obtain the converted result data comprises:

performing decryption processing on the received conversion parameter based on the decryption key to obtain the decrypted result data.

9. The image forming control method according to claim 6, wherein identifying the data to-be-written in the converted result data further comprises:

verifying the data to-be-written based on the verification data, if the verification is successful, determining the conversion processing of the received conversion parameter is successful; and if the verification fails, determining the conversion processing of the received conversion parameter is failed.

10. The image forming control method according to claim 1, further comprising:

providing a compensation value to the image forming apparatus.

11. A consumable chip, wherein the consumable chip is capable of being installed on a consumable, and the consumable is capable of being detachably installed on an image forming apparatus, comprising:

a chip control unit, configured to receive a conversion parameter sent by the image forming apparatus, wherein the received conversion parameter is generated by data to-be-written which is to be written to the consumable chip, verification data configured to determine correctness of the data to-be-written, and a preset conversion intermediate parameter corresponding to the image forming apparatus;

obtain a preset codebook, and determine response information based on the preset codebook and the received conversion parameter; and send the response information to the image forming apparatus, wherein the chip control unit is configured to determine a preset conversion intermediate parameter corresponding to the consumable chip based on the preset codebook, wherein the preset conversion intermediate parameter corresponding to the consumable chip is corresponding to an environmental data of an environment where the consumable chip is currently located based on the preset codebook;

perform conversion processing on the received conversion parameter based on the preset conversion intermediate parameter corresponding to the consumable chip; and determine the response information based on a result of the conversion processing.

12. The consumable chip according to claim 11, wherein the chip control unit is configured to obtain the environmental data where the consumable chip is currently located; and determine the preset conversion intermediate parameter corresponding to the consumable chip based on the environmental data, the preset codebook, and a stored corresponding relationship between environmental data and conversion intermediate parameters.

13. The consumable chip according to claim 11, wherein the chip control unit is configured to if the conversion processing is unsuccessful, send prompt information indicating that the conversion processing is failed to the image forming apparatus; and if the conversion processing is successful, send the conversion parameter obtained through the conversion processing to the image forming apparatus.

14. The consumable chip according to claim 12, wherein the chip control unit is configured to determine a current environmental data encoding value based on the environmental data and the stored corresponding relationship between the environmental data and the conversion intermediate parameters;

determine other environmental data encoding values adjacent to the current environmental data encoding value, thereby obtaining the multiple encoding combinations including the current environmental data encoding value and the other environmental encoding values; and generate the preset conversion intermediate parameter corresponding to the consumable chip based on any one encoding combination of the multiple encoding combinations.

15. The consumable chip according to claim 14, wherein the chip control unit is configured to use the corresponding to any one encoding combination of the multiple encoding combinations to perform the conversion processing on the received conversion parameter, and determine whether the conversion processing is successful; and if the conversion processing is unsuccessful, perform the conversion processing on the received conversion parameter based on the preset conversion intermediate parameter corresponding to the consumable chip corresponding to a next encoding combination in the multiple encoding combinations until it is determined the conversion processing is successful or the conversion processing performed on the received conversion parameter using the preset conversion intermediate parameters corresponding to the consumable chip corresponding to all encoding combinations in the multiple encoding combinations is completed.

16. The consumable chip according to claim 11, wherein the chip control unit is configured to
perform conversion processing on the received conversion parameter based on the preset conversion intermediate parameter corresponding to the consumable chip to obtain the converted result data; and
identify the data to-be-written in the converted result data.

17. The consumable chip according to claim 16, wherein the chip control unit is further configured to save the data to-be-written.

18. The consumable chip according to claim 16, wherein the chip control unit is further configured to
determine a decryption key based on the preset codebook; and
perform decryption processing on the received conversion parameter based on the decryption key to obtain the decrypted result data.

19. The consumable chip according to claim 16, wherein the chip control unit is further configured to
verify the data to-be-written based on the verification data, if the verification is successful, determine the conversion processing of the received conversion parameter is successful; and if the verification fails, determine the conversion processing of the received conversion parameter is failed.

20. The consumable chip according to claim 11, wherein the chip control unit is further configured to provide a compensation value to the image forming apparatus.

21. The consumable chip according to claim 11, wherein the consumable chip further comprises a second detection unit configured to detect environmental data of the environment where the consumable chip is located.

22. A consumable, comprising:
a housing;
a developer accommodating portion; and
the consumable chip according to claim 11.

23. The consumable according to claim 22, further comprising:
a developer conveying element, configured to convey a developer.

24. The consumable according to claim 23, further comprising:
a photosensitive drum; and
a charging roller, configured to charge the photosensitive drum.

25. The consumable according to claim 24, further comprising:
a second detection unit, configured to detect environmental data of environment where the consumable chip is located.

26. A consumable, comprising:
a photosensitive drum;
a charging roller; and
the consumable chip according to claim 11.

27. The consumable according to claim 26, further comprising:
a second detection unit, configured to detect environmental data of environment where the consumable chip is located.

* * * * *